(12) United States Patent
Takenaka et al.

(10) Patent No.: US 8,174,511 B2
(45) Date of Patent: May 8, 2012

(54) TOUCH PANEL DISPLAY, ELECTRONIC APPARATUS AND PLAYING APPARATUS

(75) Inventors: Mikio Takenaka, Kanagawa (JP); Shigeaki Maruyama, Kanagawa (JP)

(73) Assignee: Sony Corporation (JP)

( * ) Notice: Subject to any disclaimer, the term of this patent is extended or adjusted under 35 U.S.C. 154(b) by 1078 days.

(21) Appl. No.: 11/895,425

(22) Filed: Aug. 24, 2007

(65) Prior Publication Data

US 2008/0055277 A1    Mar. 6, 2008

(30) Foreign Application Priority Data

Aug. 29, 2006    (JP) ................................ P2006-231817

(51) Int. Cl.
*G06F 3/043*    (2006.01)

(52) U.S. Cl. ......... 345/177; 345/178; 345/156; 345/104

(58) Field of Classification Search .................... 345/87, 345/178, 156, 177, 104; 340/706, 712, 365; 178/18.01–18.09
See application file for complete search history.

(56) References Cited

U.S. PATENT DOCUMENTS

| | | | |
|---|---|---|---|
| 4,675,569 A * | 6/1987 | Bowman et al. | 310/328 |
| 7,205,978 B2 | 4/2007 | Poupyrev et al. | |
| 2004/0178250 A1 * | 9/2004 | Cherian | 228/180.1 |
| 2004/0227721 A1 * | 11/2004 | Moilanen et al. | 345/107 |
| 2007/0116261 A1 * | 5/2007 | Hawker et al. | 379/419 |
| 2007/0146316 A1 | 6/2007 | Poupyrev et al. | |

FOREIGN PATENT DOCUMENTS

JP    2003-288158 A    10/2003

\* cited by examiner

*Primary Examiner* — Lun-Yi Lao
*Assistant Examiner* — Shaheda Abdin
(74) *Attorney, Agent, or Firm* — Lerner, David, Littenberg, Krumholz & Mentlik, LLP

(57) ABSTRACT

Disclosed herein is a touch panel display including, a flat plate-shaped movable panel unit, a movable support member, an acoustic vibration unit, and a soft member, wherein the acoustic vibration unit includes, a sound generating member, an actuator, and a hard member.

13 Claims, 6 Drawing Sheets

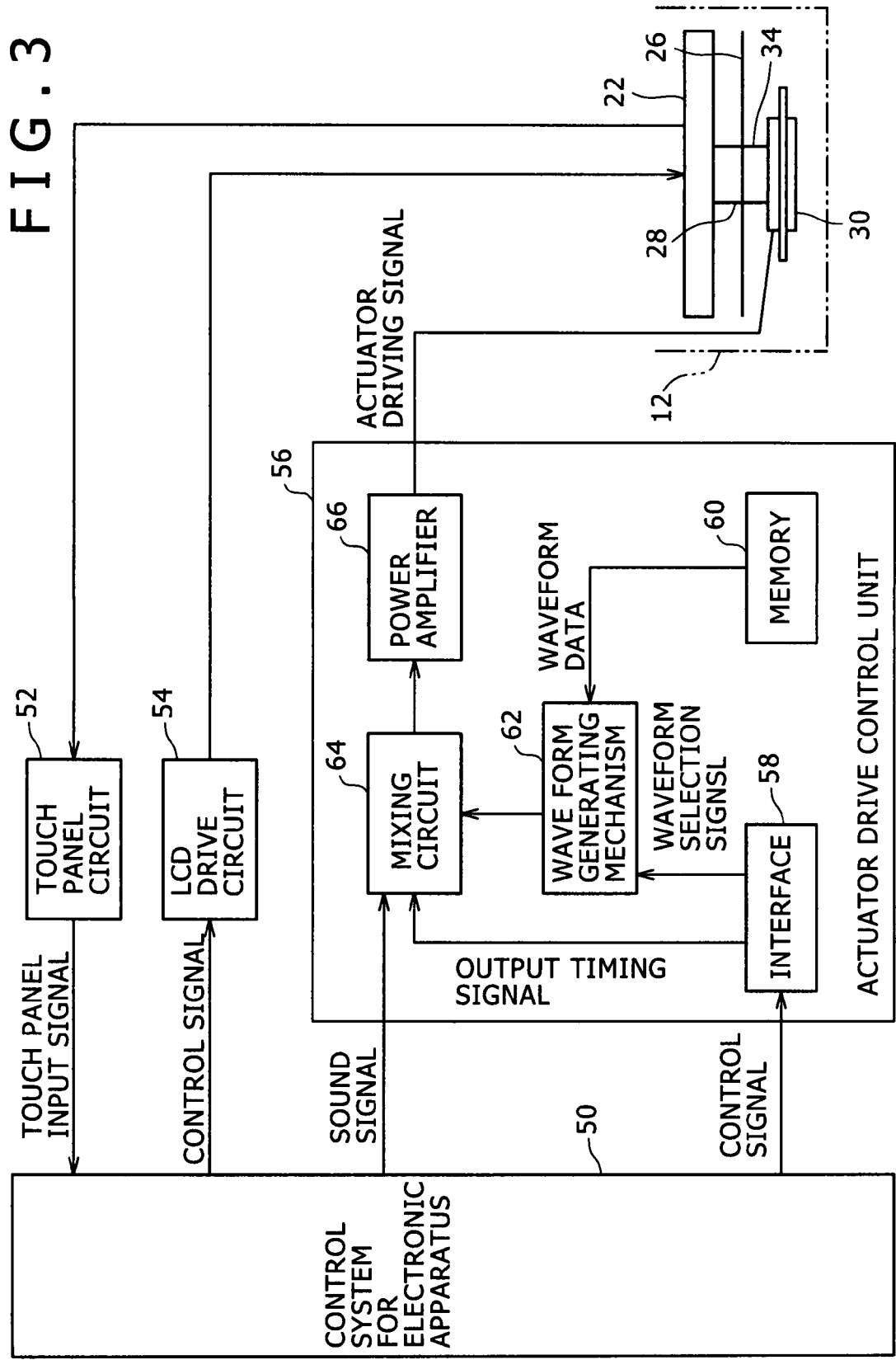

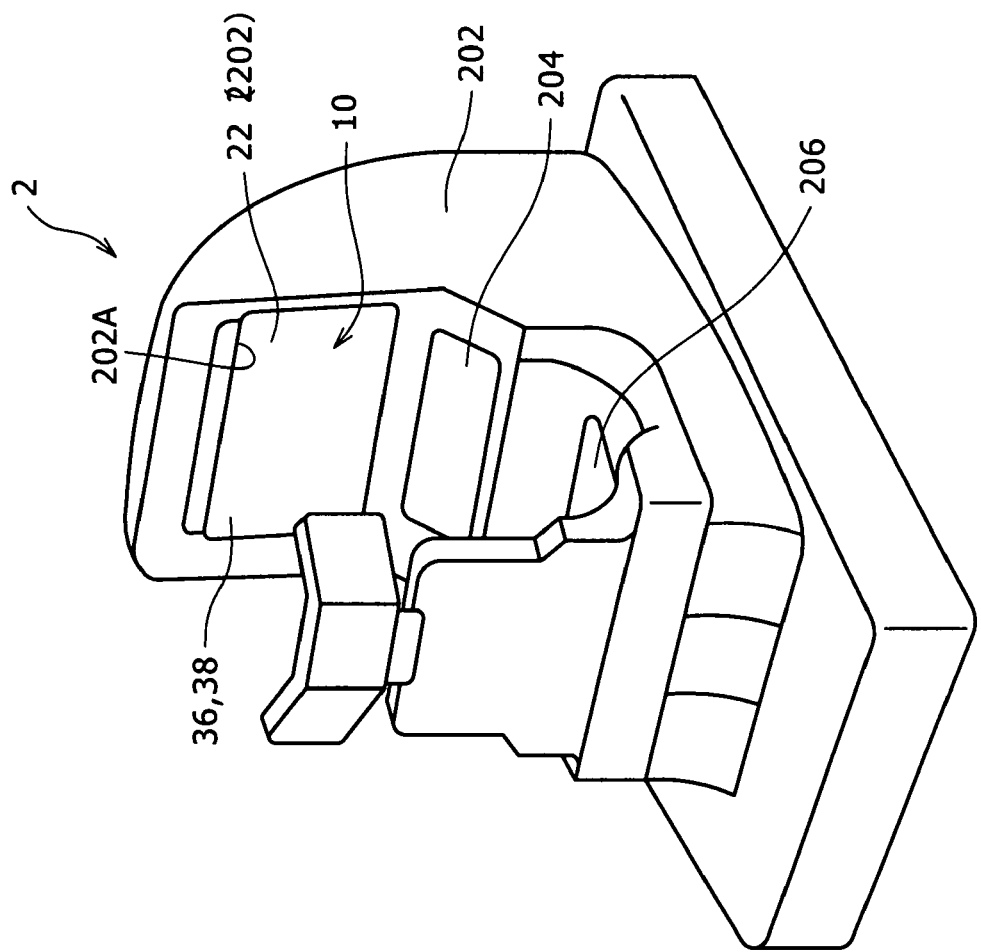
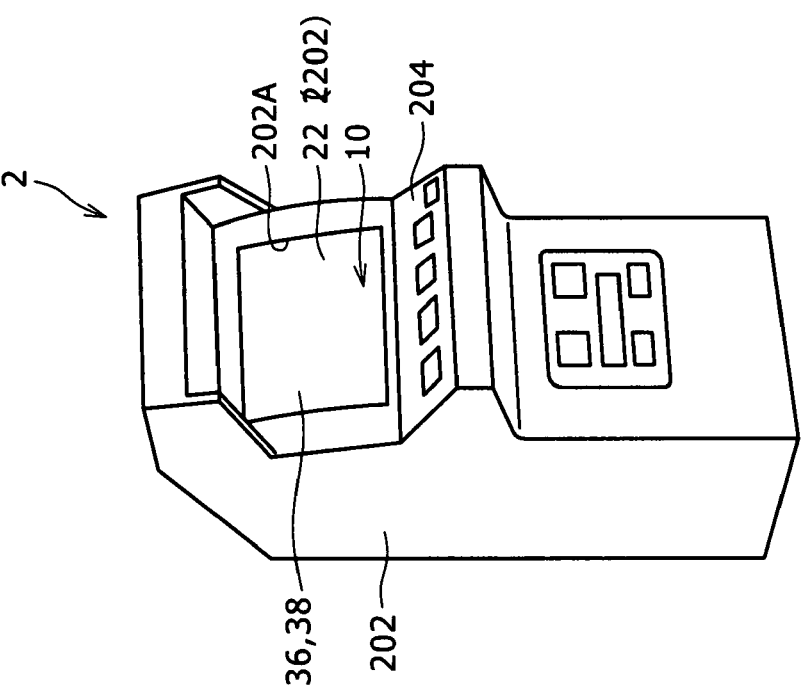

TOUCH PANEL DISPLAY, ELECTRONIC APPARATUS AND PLAYING APPARATUS

CROSS-REFERENCE TO RELATED APPLICATIONS

The present application claims priority from Japanese Patent Application No. JP 2006-231817, filed in the Japanese Patent Office on Aug. 29, 2006, the entire content of which is incorporated herein by reference.

BACKGROUND OF THE INVENTION

1. Field of the Invention

The present invention relates to a touch panel display, an electronic apparatus and a playing apparatus (game machine) which each have the touch panel display.

2. Description of the Related Art

A touch panel display used as an input device or an input/output device is advantageous in that an input screen can be freely configured by use of software, and it therefore has a flexibility which cannot be obtained with an input device composed by use of mechanical switches. In addition, the touch panel display can be configured to be light in weight and compact in form, and is low in frequency of occurrence of mechanical failures. Due to these advantages, touch panel displays are widely used at present, ranging from console panels for comparatively large machines to input devices for very small portable apparatuses.

Many of the touch panel displays are so designed that the user's fingertip operating the touch panel display only touches a flat and smooth panel surface. Therefore, the touch panel displays do not give a click feeling such as those sensed by a fingertip operating an input device composed by use of mechanical switches. This has been the cause of the indefinite feeling in operating a touch panel display. To solve this problem, a touch panel display in which a tactile sensation is fed back to the user's fingertip operating the touch panel display has been disclosed in Patent Document 1. The touch panel display disclosed in Japanese Patent Laid-open No. 2003-288158 is so configured that a touch panel touched by the user's fingertip is vibrated in the direction orthogonal to the panel surface, whereby a tactile sensation is generated at the user's fingertip.

SUMMARY OF THE INVENTION

However, in the touch panel display disclosed in Patent Document 1, an actuator for generating a vibration should be disposed between a touch panel and a display panel, between the display panel and a backlight, or between the backlight and a frame, which makes it difficult to reduce the thickness of the apparatus having the touch panel display. In view of this, it may be contemplated to contrive a thinner apparatus thickness by a method in which a touch panel of the film type becoming a main stream in mobile apparatuses is adhered directly to a display panel. In that case, however, a quite high driving force may be needed to vibrate the display panel itself, leading to an increase in power consumption. Besides, in the case where a function of generating a sound by vibrating a liquid crystal display panel is added, a large power consumption may be needed also at the time of outputting the sound.

Thus, there is a need for a touch panel display advantageous in contriving a smaller power consumption, and for an electronic apparatus and a playing apparatus which each have such a touch panel display.

According to an embodiment of the present invention, there is provided a touch panel display including: a flat plate-shaped movable panel unit having a display panel and a touch panel integrally stacked over a display surface of the display panel; a movable support member being elastic and supporting the movable panel unit over a support structure so that the movable panel unit can be displaced in the thickness direction thereof; an acoustic vibration unit provided between a back surface, fronting on the support structure, of the movable panel unit and the support structure; and a soft member provided between the back surface of the movable panel unit and the acoustic vibration unit, and being put into a compressed state when a front surface of the touch panel is depressed and into a non-compressed state when the front surface of the touch panel is not depressed, wherein the acoustic vibration unit includes: a sound generating member for generating a sound by vibrating; an actuator vibrating when supplied with a driving signal; and a hard member connecting the sound generating member and the actuator to each other and transmitting the vibration of the actuator to the sound generating member, an actuator drive control unit being provided for supplying the driving signal to the actuator, the vibration of the actuator being transmitted to the movable panel unit through the soft member when the soft member is in the compressed state, and the vibration of the actuator being not transmitted to the movable panel unit when the soft member is in the non-compressed state, because of intermediate presence of a space between the soft member and the back surface of the movable panel unit, or because of absorption of the vibration by the soft member.

According to a another embodiment of the present invention, there is provided a touch panel display including: a flat plate-shaped movable unit movable panel unit having a display panel and a touch panel integrally stacked over a display surface of the display panel; a movable support member being elastic and supporting the movable panel unit over a support structure so that the movable panel unit can be displaced along a front surface of the touch panel; an acoustic vibrating unit provided between the movable panel unit and the support structure in a direction along the front surface of the touch panel; and a soft member provided between the movable panel unit and the acoustic vibration unit and being put into a compressed state when the front surface of the touch panel is depressed and into a non-compressed state when the front surface of the touch panel is not depressed, wherein the acoustic vibration unit includes: a sound generating member for generating a sound by vibrating; an actuator vibrating when supplied with a driving signal; and a hard member connecting the sound generating member and the actuator to each other and transmitting the vibration of the actuator to the sound generating member, an actuator drive control unit being provided for supplying the driving signal to the actuator, the vibration of the actuator being transmitted to the movable panel unit through the soft member when the soft member is in the compressed state, and the vibration of the actuator being not transmitted to the movable panel unit when the soft member is in the non-compressed state, because of intermediate presence of a space between the soft member and the movable panel unit, or because of absorption of the vibration by the soft member.

According to a further embodiment of the present invention, there is provided an electronic apparatus having an apparatus-side casing, a touch panel display being mounted in or on the apparatus-side casing, and the touch panel display including: a flat plate-shaped movable panel unit having a display panel and a touch panel integrally stacked over a display surface of the display panel; a movable support member being elastic and supporting the movable panel unit over a support structure so that the movable panel unit can be displaced in the thickness direction thereof; an acoustic vibration unit provided between a back surface, fronting on the support structure, of the movable panel unit and the support structure; and a soft member provided between the back surface of the movable panel unit and the acoustic vibration unit, and being put into a compressed state when a front surface of the touch panel is depressed and into a non-compressed state when the front surface of the touch panel is not depressed, wherein the acoustic vibration unit includes: a sound generating member for generating a sound by vibrating; an actuator vibrating when supplied with a driving signal; and a hard member connecting the sound generating member and the actuator to each other and transmitting the vibration of the actuator to the sound generating member, an actuator drive control unit being provided for supplying the driving signal to the actuator, the vibration of the actuator being transmitted to the movable panel unit through the soft member when the soft member is in the compressed state, and the vibration of the actuator being not transmitted to the movable panel unit when the soft member is in the non-compressed state, because of intermediate presence of a space between the soft member and the back surface of the movable panel unit, or because of absorption of the vibration by the soft member.

According to yet another embodiment of the present invention, there is provided a playing apparatus having an apparatus-side casing, a tough panel display being mounted in or on the apparatus-side casing, and the touch panel display including: a flat plate-shaped movable panel unit having a display panel and a touch panel integrally stacked over a display surface of the display panel; a movable support member being elastic and supporting the movable panel unit over a support structure so that the movable panel unit can be displaced in the thickness direction thereof; an acoustic vibration unit provided between a back surface, fronting on the support structure, of the movable panel unit and the support structure; and a soft member provided between the back surface of the movable panel unit and the acoustic vibration unit, and being put into a compressed state when a front surface of the touch panel is depressed and into a non-compressed state when the front surface of the touch panel is not depressed, wherein the acoustic vibration unit includes: a sound generating member for generating a sound by vibrating; an actuator vibrating when supplied with a driving signal; and a hard member connecting the sound generating member and the actuator to each other and transmitting the vibration of the actuator to the sound generating member, an actuator drive control unit being provided for supplying the driving signal to the actuator, the vibration of the actuator being transmitted to the movable panel unit through the soft member when the soft member is in the compressed state, and the vibration of the actuator being not transmitted to the movable panel unit when the soft member is in the non-compressed state, because of intermediate presence of a space between the soft member and the back surface of the movable panel unit, or because of absorption of the vibration by the soft member.

According to the embodiments of the present invention, the electric power consumed by the actuator at the time of generating a sound can be reduced, as compared with the electric power consumed by the actuator at the time of generating a tactile feedback, which is advantageous in contriving a reduction in the power consumption of a touch panel display.

BRIEF DESCRIPTION OF THE DRAWINGS

FIG. 3 is a block diagram showing a control unit and electronic circuits constituting the touch panel display;

FIGS. 5A and 5B are illustrations of a playing apparatus according to a second embodiment of the present invention.

DETAILED DESCRIPTION OF THE PREFERRED EMBODIMENTS

<First Embodiment>

Now, an embodiment of the present invention will be described below.

Figure 1:
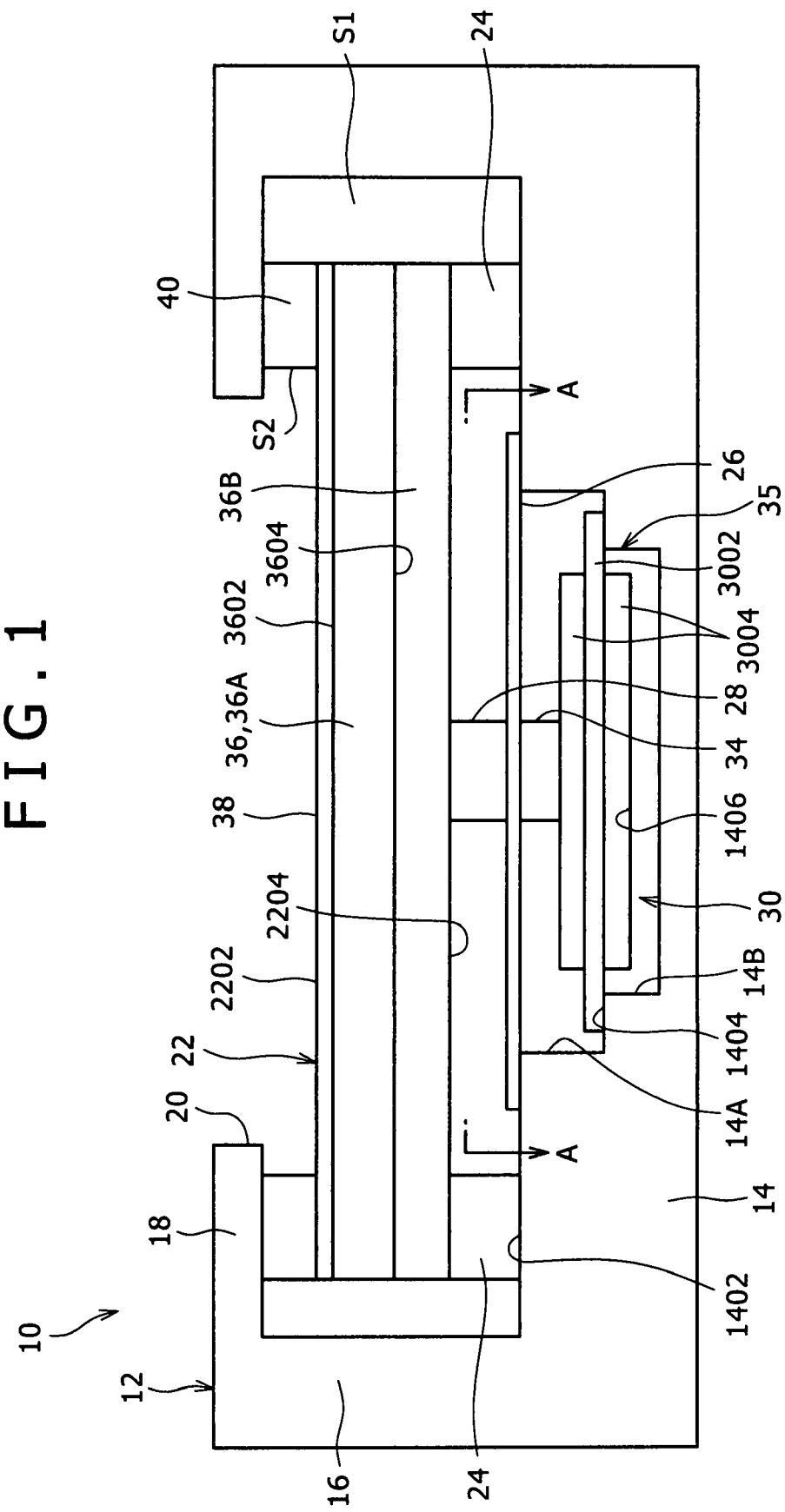
FIG. 1 is a sectional view showing the configuration of a touch panel display according to an embodiment of the present invention.
Figure 2:
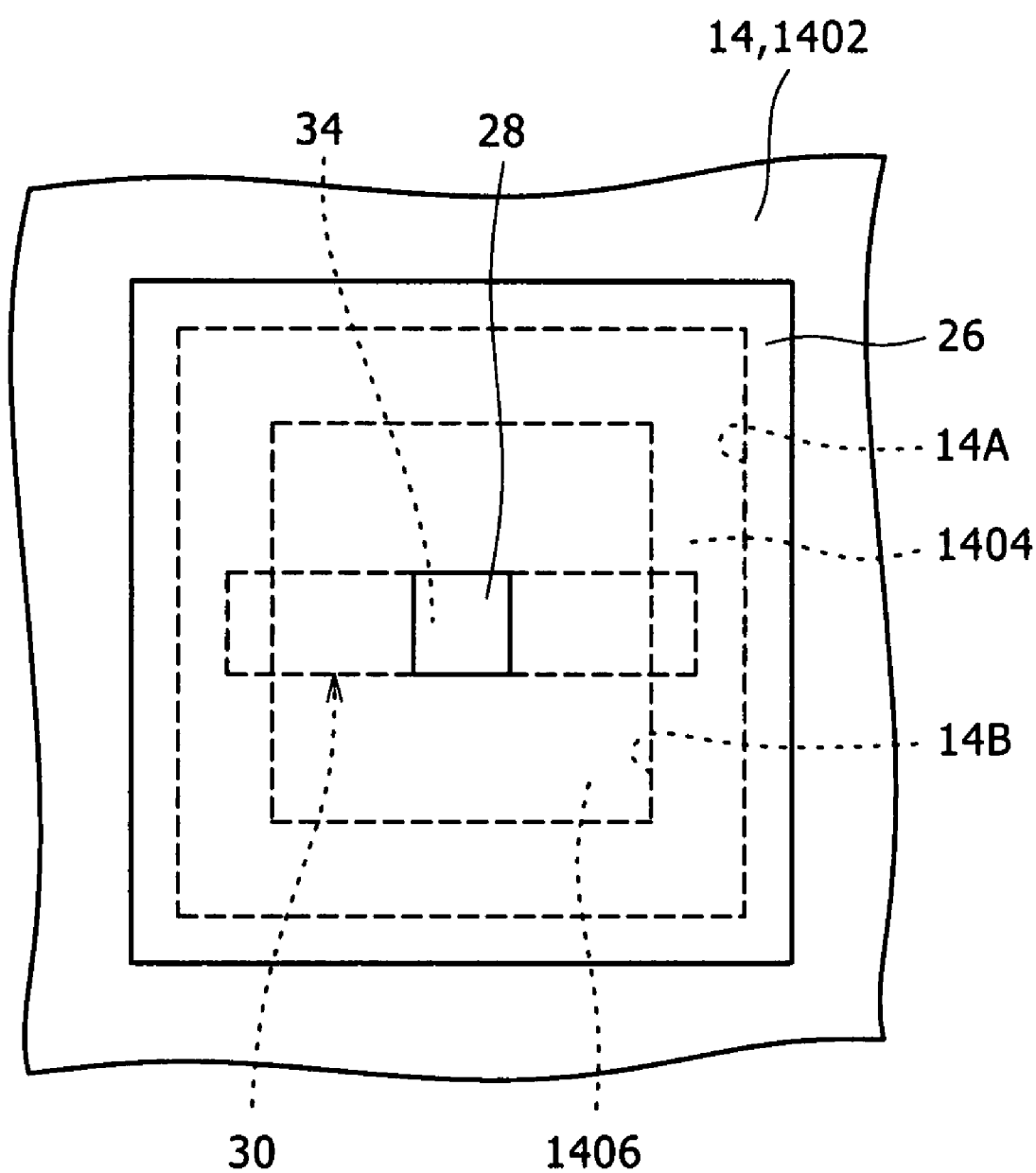
FIG. 2 is a view taken along arrowed line A-A of FIG. 1.
Figure 4A:
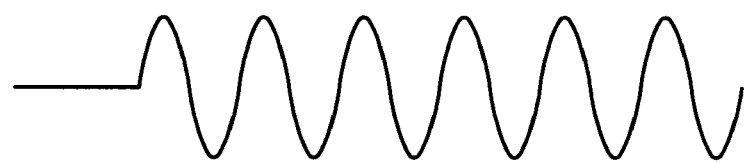
FIGS. 4A to 4D show specific examples of a waveform generated by a waveform generating mechanism.
Figure 4B:
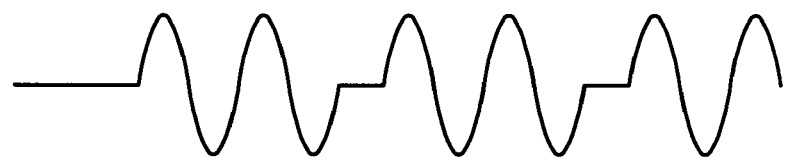
Figure 4C:
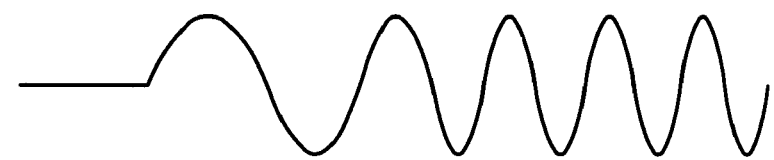
Figure 4D:
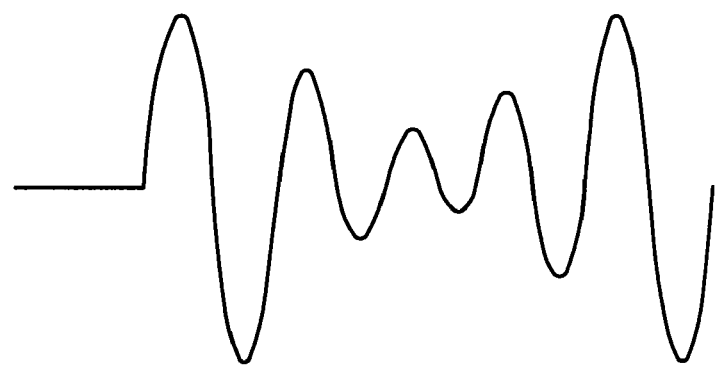

FIG. 1 is a sectional view showing the configuration of a touch panel display 10 according to an embodiment of the present invention, and FIG. 2 is a view taken along arrowed line A-A of FIG. 1.

The touch panel display 10 includes a casing 12 (support structure), a movable panel unit 22, a movable support member 24, a sound generating member 26, a soft member 28, an actuator 30, a hard member 34, an actuator drive control unit 56 (see FIG. 3) and the like.

As shown in FIG. 1, the casing 12 has a rectangular plate-like bottom wall 14, four side walls 16 rising from the periphery of the bottom wall 14, and a rectangular frame-like upper wall 18 bent from the upper ends of the four side walls 16 toward the inside of the side walls 16 to be parallel to the bottom wall 14. Edge parts of the upper wall 18 define a rectangular opening 20.

As shown in FIG. 2, a rectangular first recessed part 14A is formed in the center of a bottom wall 1402, fronting on the opening 20, of the bottom wall 14. A rectangular second recessed part 14B a little smaller than the first recessed part 14A is formed in the center of a bottom surface 1404, fronting on the opening 20, of the first recessed part 14A. The second recessed part 14B has a bottom surface 1406 fronting on the opening 20.

The movable panel unit 22 has a display panel 36 for displaying an image when supplied with a control signal for displaying the image, and a touch panel 38 integrally stacked on a display surface 3602 of the display panel 36, and is rectangular plate-like (flat plate-like) in shape.

In this embodiment, the display panel 36 is configured as a transmission type liquid crystal display, and includes a display body 36A having a liquid crystal, layer and two glass substrates sandwiching the liquid crystal layer therebetween, and a backlight 36B which is attached to a back surface 3604, located on the opposite side of the display surface 3602, of the display body 36A and which illuminates the display body 36A in the direction of from the back surface 3604 toward the display surface 3602. The backlight 36B is integrally attached to the display body 36A.

The display panel 36 may be configured as a reflection type liquid crystal display or an organic EL display, which does not need a backlight.

The touch panel 38 is configured, for example, as a so-called film-film type touch panel in which a transparent electrode film is formed between two transparent PET films so that the movable panel unit 22 is made thinner.

The touch panel 38 is so sized as to cover the whole area of the display surface 3602, is stacked on the display surface

3602, and is adhered to the display surface 3602 by use of an adhesive or the like, so as to be integral with the display panel 36.

Therefore, in this embodiment, a front surface 2202 of the movable panel unit 22 is composed of the front surface of the touch panel 38, and a back surface 2204 of the movable panel unit 22 is composed of the back surface of the backlight 36B.

The movable support member 24 supports the movable panel unit 22 on the bottom wall 14 inside the casing 12 so that the movable panel unit 22 can be displaced in the thickness direction thereof, in the condition where the four edges of the movable panel unit 22 are set parallel to the side walls 16, the movable panel unit 22 is set parallel to the bottom surface 1402 of the bottom wall 14, and the front surface 2202 of the movable panel unit 22 is exposed through the opening 20 to the exterior. The movable support member 24 is formed from an elastic material.

In this embodiment, the movable support member 24 is provided between the movable panel unit 22 and the bottom surface 1402, at the four corners of the back surface 2204 of the movable panel unit 22.

Such an elastic material is desirably a material making it possible to displace the movable panel unit 22 as easily as possible; for this purpose, the elastic material preferably includes a polymer gel material having a superlow hardness.

For example, a sheet-formed polymer gel material with a superlow hardness which is commercially available under the product name "KG GEL (trademark)" from Kitagawa Industries Co., Ltd. is particularly suitable as the material of the movable support member 24. In a specific example, a 1 mm thick sheet of "KG GEL (trademark)" is cut to 2 mm square to obtain elastic blocks which are 1 mm high, and the upper and lower surfaces of the elastic blocks are adhered to the four corners of the bottom wall 14 and the four corners of the back surface 2204 of the movable panel unit 22 by use of double coated adhesive sheets or the like, whereby the movable support member 24 of the movable panel unit 22 can be configured favorably.

In this embodiment, the amount of displacement of the movable panel unit 22 in the thickness direction thereof when the front surface 2202 of the movable panel unit 22 is depressed with a finger is, for example, about 0.2 to 0.3 mm.

Appropriate examples of the elastic material other than the above-mentioned polymer gel material include various rubber materials, soft polyethylene, and silicone resins.

The sound generating member 26, supported on the bottom surface 1402 of the bottom wall 14 and located to face the back surface 2204 of the movable panel unit 22, generates a sound by vibrating in the same manner as a cone or a loudspeaker. The sound generating member 38 includes a thin plate-like hard plastic material excellent in elasticity.

Preferable examples of such a material include biaxially oriented polyethylene naphthalate film (PEN film) and biaxially oriented polyethylene terephthalate film (PET film).

The sound generating member 26 is lighter than the movable panel unit 22 in weight, the weight of the sound generating member 26 is one severals of that of the movable panel unit 22.

In this embodiment, the sound generating member 26 has a rectangular plate-like shape a little larger than the first recessed part 14A, and the whole circumference of a part, fronting on the bottom surface 1402, of a surface on one side in the thickness direction of the sound generating member 26 is gaplessly adhered to the bottom surface 1402 by use of an adhesive, whereby the first recessed part 14A is hermetically closed with the sound generating member 26. With the first recessed part 14A thus hermetically closed with the sound generating member 26, the generation of a sound by vibration of the sound generating member 26 is performed efficiently.

The soft member 28 is provided between a central part of the back surface 2204 of the movable panel unit 22 and a central part of the sound generating member 26. Like the movable support member 24, the soft member 28 is formed from an elastic material such as polymer gel materials, rubber materials, soft polyethylene, and silicone resins.

The soft member 28 is so configured as to absorb vibrations when being in a non-compressed state and to transmit vibrations when being in a compressed state.

The soft member 28 has a block-like shape which is rectangular in plan view. A surface on one side in the height direction of the soft member 28 is fixed by being adhered to the actuator 30 with an adhesive.

In a specific example of the soft member 28, a 1 mm thick sheet of "KG GEL (trademark)" is cut to 2 mm square to obtain an elastic block which is 1 mm high, and a surface on one side in the thickness direction of the elastic block is adhered to the actuator 30 by use of an double coated adhesive sheet or the like, whereby the soft member 28 can be configured favorably.

The surface on the other side in the height direction of the soft member 28 is put in contact with the back surface 2204 of the movable panel unit 22 or is so set as to form a space between itself and the back surface 2204 of the movable panel unit 22. Incidentally, in the case where the surface on the other side in the height direction of the soft member 28 is in contact with the back surface 2204 of the movable panel unit 22, the soft member 28 is not compressed in the height direction, and is in the state of being capable of absorbing vibrations.

The actuator 30 is supported by the bottom surface 1404 which is the part, located on the opposite side of the movable panel unit 22 with respect to the sound generating member 26, of the bottom wall 14. The actuator 30 vibrates by being supplied with an actuator driving signal (corresponding to the driving signal in the claims) from an actuator drive control unit 32 which will be described later.

In this embodiment, a strip-like bend displacement type piezoelectric actuator is used as the actuator 30. More specifically, piezoelectric elements 3004 are attached respectively to both sides of a strip-formed elastic plate 3002 to constitute the actuator 30, and both end parts in the longitudinal direction of the elastic plate 3002 where the piezoelectric element 3004 is not provided are attached, with an adhesive, to two parts of the bottom surface 1404 which are located on opposite sides of the second recessed part 14B.

With a driving signal supplied to the piezoelectric elements 3004, the piezoelectric elements 3004 are extended and contracted, whereby the elastic plate 3002 is deflected alternately to both sides in the thickness direction thereof, in other words, bendingly displaced to both sides in the thickness direction thereof, thereby generating a vibration.

Incidentally, as this kind of piezoelectric actuator, bimorph type piezoelectric actuators and monomorph type piezoelectric actuators are known, of which the bimorph type ones are preferred since they can exhibit stronger driving forces. In addition, comparing a single-layer bimorph type piezoelectric actuator with a laminated bimorph type piezoelectric actuator, the former can be driven with a lower voltage and, therefore, is more preferable for use, in mobile electronic apparatuses.

Besides, the structure for mounting the actuator 30 to the bottom wall 14 is not limited to the so-called both end supported structure in which both ends in the longitudinal direction of the actuator 30 are attached to the bottom wall 14 as in this embodiment, and may be of the so-called cantilever structure in which only one end in the longitudinal direction of the actuator 30 is attached to the bottom wall 14. Where the actuator 30 is made with the both end supported structure as in this embodiment, the vibration generated by the actuator 30 can be generated more efficiently, which is advantageous in contriving a reduction in electric power for driving the actuator 30, as compared with the case of the cantilever structure.

The hard member 34 is a member for connecting a central part of the sound generating member 26 and a central part of the actuator 30 to each other and thereby transmitting the vibration of the actuator 30 to the sound generating member 26.

It suffices for the hard member 34 to be formed from a material which transmits vibrations without absorption. Examples of the material which can be used to form the hard member 34 include PET (polyethylene terephthalate).

The hard member 34 has a block-like shape which is rectangular in plan view. Of the hard member 34, a surface on one side in the height direction is adhered to a surface of the sound generating member 26 with a pressure sensitive adhesive double coated tape, and the surface on the other side is adhered to the actuator 30 with a pressure sensitive adhesive double coated tape.

Incidentally, in this embodiment, the sound generating member 26, the actuator 30, and the hard member 34 constitute an acoustic vibration unit 35.

Therefore, in the condition where the front surface 2202 of the movable panel unit 22 (the front surface of the touch panel 38) is depressed and the movable panel unit 22 is displaced in the thickness direction thereof toward the actuator 30 with the result that the soft member 28 is compressed between the movable panel unit 22 and the sound generating member 26, the vibration of the actuator 30 is transmitted to the movable panel unit 22 through the hard member 34, the sound generating member 26 and the soft member 28 being in the compressed state.

In addition, in the case where a space is formed between the surface on the other side in the height direction of the soft member 28 and the back surface 2204 of the movable panel unit 22 and in the condition where the soft member 28 is not compressed between the movable panel unit 22 and the sound generating member 26, the presence of the space prevents the vibration of the actuator 30 from being transmitted to the movable panel unit 22.

Besides, in the case where the surface on the other side in the height direction of the soft member 28 is set in contact with the back surface 2204 of the movable panel unit 22 and in the condition where the soft member 28 is not compressed in the height direction thereof, the vibration of the actuator 30 is absorbed by the soft member 28, so that the vibration is not transmitted to the movable panel unit 22.

As shown in FIG. 1, a first space S1 is secured between the four side surfaces of the movable panel unit 22 and the side walls 16 so that the movable panel unit 22 and the side walls 16 do not interfere with each other.

In addition, a second space S2 is secured between the upper wall 18 and the whole perimeter of the four edges of the front surface 2202 of the movable panel unit 22 so that the movable panel unit 22 and the upper wall 18 do not interfere with each other. In order to prevent dust from penetrating in through this space, an elastic material 40 with weak elasticity at such a level as not to hamper the vibration of the movable panel unit 22 is disposed between the upper wall 18 and the front surface 2202 of the movable panel unit 22 along the whole perimeter of the four edges of the front surface 2202 of the movable panel unit 22, whereby the second space S2 is closed.

As the elastic material 40, urethane foam can be used, an example of which is commercially available under the product name "PORON" from Inoac Corporation.

FIG. 3 is a block diagram showing a control unit and electronic circuit which are components of the touch panel display 10.

Symbol 50 denotes a control system of an electronic apparatus having the touch panel display 10, and the control unit and electronic circuits of the touch panel display 10 are under the control of the control system 50.

The control unit and electronic circuits of the touch panel display 10 include a touch panel circuit 52 connected to the touch panel 38 which is a component on one side of the movable panel unit 22, an LCD drive circuit 54 connected to the display panel 36 which is a component on the other side of the movable panel unit 22, and an actuator drive control unit 56 for drivingly controlling the actuator 30.

The touch panel circuit 52 is a circuit generally is used attendant on a touch panel, and processes a signal obtained from the touch panel to thereby generate a signal indicative of the position on the panel surface of the touch panel 38 (the front surface 2202 of the movable panel unit 22) where a user's fingertip is making contact with the panel surface.

In addition, in the case where the touch panel circuit 52 can detect the contact pressure on the touch panel 38, the touch panel circuit 52 generates also a signal indicative of the contact pressure. Besides, if necessary, by further processing the signal indicative of the contact position on the panel surface, the touch panel circuit 52 may generate a signal or signals indicative of the moving velocity and/or acceleration of the fingertip making contact with the panel surface.

The signal generated by the touch panel circuit 52 is supplied to the control system 50 as a touch panel input signal. The LCD drive circuit 54 is a circuit generally used attendant on a liquid crystal display panel, and drives the display panel 36 to perform a visual display, according to a control signal received from the control system 50.

The actuator drive control unit 56 includes a one-chip computer, which has a central processor unit and a memory, and an electronic circuit, and further includes an interface 58 for receiving the control signals from the control system 50. The control signal received from the control system 50 include an output timing signal and a waveform selection signal. The actuator drive control unit 56 has a memory 60, which stores data (waveform data) necessary for waveform generation which correspond respectively to a plurality of waveforms. The actuator drive control unit 56 further includes a waveform generating mechanism 62, a mixing circuit 64, and a power amplifier 66.

The waveform generating mechanism 62 is a mechanism composed of software, reads from the memory 60 the data corresponding to a waveform designated by the waveform selection signal, and generates a waveform according to the waveform data thus read. The mixing circuit 64 outputs an output signal having the waveform generated by the waveform generating mechanism 62, over a period designated by the output timing signal, and outputs also as an output signal a sound signal supplied from the control system 50.

In addition, the power amplifier 66 amplifies the output signal outputted from the mixing circuit 64, and supplies the amplified signal to the piezoelectric actuator 30 as an actuator driving signal.

FIGS. 4A to 4D show specific examples of the waveform generated by the waveform generating mechanism 62. As is clear from the figures, these waveforms are vibration waveforms, which may be constant or may vary in amplitude, period and/or wave shape. The waveform data stored in the memory 60 include data relating to amplitude and period. From among the waveform data corresponding to a plurality of waveforms which are stored in the memory 60, the waveform data relevant to the waveform designated by the waveform selection signal is read, and an actuator driving signal having the waveform is supplied to the actuator 30, so that the movable panel unit 22 is vibrated along the direction orthogonal to the panel surface, according to the waveform of the actuator driving signal.

This vibration of the movable panel unit 22 generates a tactile sensation according to the waveform of the actuator driving signal, at the user's fingertip making contact with the panel surface of the movable panel unit 22. In other words, the actuator drive control unit 56 is a unit for driving the movable panel unit 22 to vibrate in a vibration pattern selected from among a plurality of predetermined vibration patterns, and the plurality of predetermined vibration patterns generate different tactile sensations at the user's fingertip making contact with the panel surface of the movable panel unit 22.

By setting the vibration amplitude of the movable panel unit to a value of about 20 to 50 μm, what kind of tactile sensation is generated at the fingertip was tested. It was found that the fingertip making contact with the panel surface of the movable panel unit 22 senses keenly the vibrating condition of the movable panel unit 22 but that it is not capable of discriminating the vibrating direction of the movable panel unit 22. On the other hand, it was revealed that the fingertip gets clearly different tactile sensations depending on the differences in the waveform of the output signal. In addition, it was also revealed that it is possible to give a pseudo-sensation of ruggedness or material to the fingertip, depending on the vibration pattern of the movable panel unit 22.

When the sound signal is outputted from the control system 50 to the actuator drive control unit 56, the sound signal is supplied as an actuator driving signal to the actuator 30.

It is to be noted here that the waveforms shown in FIGS. 4A to 4D which are generated by the waveform generating mechanism 62 are different from the sound signal in frequency band. Since the waveforms generated by the waveform generating mechanism 62 are for the purpose of generating tactile sensations at the user's fingertip, the vibration frequency is set in the range of about 50 to 200 Hz for permitting the user's fingertip to keenly sense the vibration.

On the other hand, the frequency of the sound signal is, for example, about 800 to 1500 Hz.

Incidentally, the sound generated at the sound generating member 26 by vibration of the actuator 30 at the frequency of the sound signal is transmitted through the space including the first space S1 and the second space S2 formed between the movable panel unit 22 and the casing 12, the elastic member 40 and the like to the exterior of the casing 12. For enhancing the transmission of the sound to the exterior, a measure may be arbitrarily adopted such as, for example, providing the bottom wall 14 and the side wall 16 of the casing 12 with sound release holes.

Now, operations at the time of generating the tactile feedback and the sound will be described below.

When the control system 50 detects the depression of the front surface 2202 of the movable panel unit 22 by a finger and drives the movable panel unit 22 to generate the tactile feedback, there is established a condition in which the vibration of the actuator 30 upon the depression of the front surface 2202 of the movable panel unit 22 by the finger can be transmitted through the soft member 28 to the movable panel unit 22.

In this instance, therefore, the control system 50 controls the actuator drive control unit 56 so that an actuator driving signal having a first electric power of a magnitude necessary for vibrating the movable panel unit 22 is supplied to the actuator 30, whereby the tactile feedback is generated at the movable panel unit 22.

In addition, when only a sound is generated under the control of the control system 50 without generating the tactile feedback, the user does not depress the front surface 2202 of the movable panel unit 22 with a finger, and, therefore, the vibration of the actuator 30 is not transmitted to the movable panel unit 22 through the soft member 28. In this condition, the control system 50 controls the actuator drive control unit 56, whereby an actuator driving signal having a second electric power of a magnitude necessary for vibrating the sound generating member 26 is supplied to the actuator 30, to generate a sound.

More specifically, at the time of generating a sound, it suffices for the actuator 30 to vibrate only the sound generating member 26 which is lighter in weight than the movable panel unit 22; therefore, the second electric power supplied to the actuator 30 in this instance is lower than the first electric power supplied at the time of generating the tactile feedback.

As has been described above, according to this embodiment, the touch panel display 10 can naturally function not only as a touch panel display generating a tactile sensation at the user's fingertip used for operation but also as a sound output device. In addition, the electric power consumed by the actuator 30 at the time of generating the sound can be reduced as compared with the electric power consumed by the actuator 30 at the time of generating the tactile feedback, which is advantageous in contriving a reduction in the power consumed by the touch panel display 10.

Therefore, the touch panel display 10 according to this embodiment is very excellent as an input/output device used particularly for a mobile electronic apparatus required of a reduced power consumption, such as digital cameras, video cameras, portable phones, PDAS, and notebook type personal computers.

Besides, in this embodiment, the sound is generated by the sound generating member 26 provided separately from the movable panel unit 22, which is quite advantageous in providing a sound with a sound quality better than that in the case of generating a sound by vibrating the movable panel unit 22. Further, this is advantageous in generating a sound containing complicated frequency components such as those of music, human talking voice, various effect sounds and natural sounds, other than a simple beep. Especially, if the movable panel unit 22 is vibrated to generate a sound, there would be a fear of the generation of a noise due to the natural vibration of the movable panel unit 22 or the generation of a noise due to the vibration of wiring members for the touch panel 38. Such a problem can be obviated when the sound generating member 26 is used, like in this embodiment.

While a configuration in which the liquid crystal display constituting the display panel 36 includes the display body 36A and the backlight 36B integrally attached to the display body 36A has been described in this embodiment, a configuration may be adopted in which the display body 36A and the backlight 36B are separate from each other, the display body 36A attached to the touch panel 38 is configured as a movable panel unit 22, and it is supported by a movable support member 24.

In that case, the weight of the movable panel unit 22 can be reduced by a value corresponding to the weight of the backlight 36B, which is advantageous in contriving a reduction in the power consumption of the actuator 30.

In addition, various layout structures can be considered with respect to the sound generating member 26, the actuator 30, and the hard member 34 constituting the acoustic vibration unit 35. For example, a configuration may be adopted in which the actuator 30 is disposed to face the movable panel unit 22, the sound generating member 26 is disposed on the opposite side of the movable panel unit 22 with reference to the actuator 30, and the soft member 28 is disposed between the actuator 30 and the movable panel unit 22, whereby the same effects as above can be obtained.

<Second Embodiment>

Now, a second embodiment of the present invention will be described below.

The second embodiment resides in the application of a touch panel display 10 of the present invention to a playing apparatus (game machine) configured as an electronic apparatus.

FIGS. 5A and 5B illustrate a playing apparatus 2 according to the second embodiment. Incidentally, in the following description of the embodiment, the equivalent or same parts and members as those in the first embodiment above will be denoted by the same symbols used above.

The playing apparatus 2 is a so-called arcade game machine installed in a shop such as a game arcade. The playing apparatus 2 shown in FIG. 5A is of the type in which the user plays a game in his standing position, while the playing apparatus 2 shown in FIG. 5B is of the type in which the user plays a game in his seated position.

As shown in FIGS. 5A and 5B, the playing apparatus 2 has an apparatus-side casing 202, a casing 12 of a touch panel display 10 is mounted to the apparatus-side casing 202, and a front surface 2202 of a movable panel unit 22 is exposed to the outside through an opening 202A provided on the front side of the apparatus-side casing 202. A console panel 204 having operating members such as pushbuttons and operating levers is provided at a position, on the lower side of the opening 202A, of the apparatus-side casing 202.

The user plays a game by depressing a touch panel 38 while visually checking the screen displayed on a display panel 36 of the touch panel display 10.

In the playing apparatus, also, the same effects as in the first embodiment above can naturally be obtained.

<Third Embodiment>

Now, a third embodiment of the present invention will be described.

The third embodiment is different from the second embodiment in the moving direction and vibrating direction at the time when a movable panel unit 22 is depressed.

Figure 6:
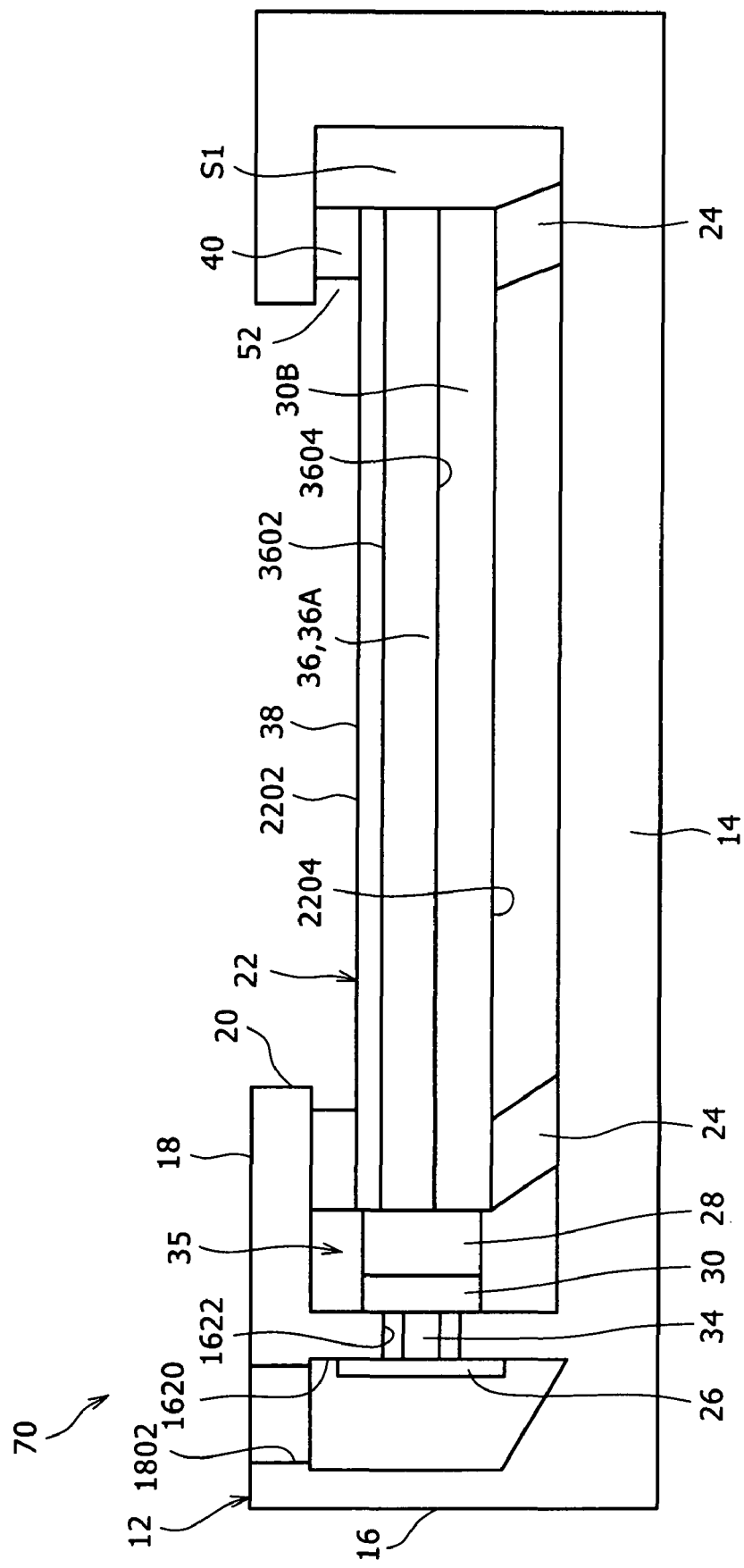
FIG. 6 is a sectional view showing the configuration of a touch panel display 70 according to a third embodiment of the present invention.

FIG. 6 is a sectional view showing the configuration of a touch panel display 70 according to the third embodiment.

In the third embodiment, the movable panel unit 22 is supported on a support structure (a bottom surface 1402 of a bottom wall 14 of a casing 12) by a movable support member 24 so that it can be displaced along the surface of a touch panel 38.

In addition, an acoustic vibration unit 35 is provided between the movable panel unit 22 and the support structure (a side wall 16 of the casing 12) in a direction along the surface of the touch panel 38.

A soft member 28 is provided between the movable panel unit 22 and the acoustic vibration unit 35. The soft member 28 is put into a compressed state when the surface of the touch panel 38 is depressed and into a non-compressed state when the surface of the touch panel 38 is not depressed.

Like in the first embodiment above, the acoustic vibration unit 35 has a sound generating member 26, an actuator 30, and a hard member 34.

Incidentally, the acoustic vibration unit 35 is disposed through a wall part 1620 erected on the inside of the side wall 16, and an opening 1622 provided in the wall part 1620. In other words, the acoustic vibration unit 35 is disposed in a first space S1.

In addition, an upper wall 18 is provided, at a position fronting on the acoustic vibration unit 35, with a sound release hole 1802 through which to transmit the sound generated from the acoustic vibration unit 35 to the exterior of the casing 12.

In the third embodiment, unlike in the first embodiment, the sound generating member 26 is located at a position the farthest from the movable panel unit 22, and the actuator 30 is disposed at a position nearer to the movable panel unit 22 side then the sound generating member 26. A soft member 28 is disposed at a position where the actuator 30 fronts on the movable panel unit 22, and a hard member 34 is so disposed as to pass through the opening 1622.

An actuator drive control unit 56 (FIG. 3) supplies an actuator driving signal to the actuator 30, like in the first embodiment.

Therefore, in the condition where a front surface 2202 of the movable panel unit 22 (the front surface of the touch panel 38) is depressed and the movable panel unit 22 is displaced toward the actuator 30 along the surface of the touch panel 38 with the result that the soft member 28 is compressed between the movable panel unit 22 and the actuator 30, the vibration of the actuator 30 is transmitted to the movable panel unit 22 through the soft member 28 being in the compressed state.

In addition, in the condition where a space is formed between a surface, fronting on the movable panel unit 22, of the soft member 28 and the movable panel unit 22 and where the soft member 28 is not compressed between the movable panel unit 22 and the actuator 30, the vibration of the actuator 30 is not transmitted to the movable panel unit 22, because of the intermediate presence of the space.

Besides, in the condition where the surface, fronting on the movable panel unit 22, of the soft member 28 is in contact with the movable panel 22 and where the soft member 28 is not compressed, the vibration of the actuator 30 is not transmitted to the movable panel unit 22, since the vibration is absorbed by the soft member 28.

In the third embodiment also, like in the first embodiment, it suffices to vibrate only the sound generating member 26 lighter in weight than the movable panel unit 22 by the actuator 30 at the time of generating a sound. Therefore, a second electric power supplied to the actuator 30 in this instance is lower than a first electric power supplied at the time of generating a tactile feedback. Accordingly, in the third embodiment also, the same effects as in the first embodiment above can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel display comprising:
   a flat plate-shaped movable panel unit having a display panel and a touch panel integrally stacked over a display surface of said display panel;
   a movable support member being elastic and supporting said movable panel unit over a support structure so that said movable panel unit can be displaced in the thickness direction thereof;
   an acoustic vibration unit provided between a back surface, fronting on said support structure, of said movable panel unit and said support structure, the acoustic vibration unit including an actuator vibrating when supplied with a driving signal; and a soft member provided between said touch panel of said movable panel unit and said actuator, and being put into a compressed state when a front surface of said touch panel is depressed and into a non-compressed state when said front surface of said touch panel is not depressed, said acoustic vibration unit including:

a sound generating member for generating a sound by vibrating; and a hard member connecting said sound generating member and said actuator to each other and transmitting the vibration of said actuator to said sound generating member, an actuator drive control unit being provided for supplying said driving signal to said actuator, said vibration of said actuator being transmitted to said movable panel unit through said soft member when said soft member is in said compressed state, and said vibration of said actuator being not transmitted to said movable panel unit when said soft member is in said non-compressed state, because of intermediate presence of a space between said soft member and said back surface of said movable panel unit, or because of absorption of said vibration by said soft member.

2. The touch panel display as set forth in claim 1, wherein said actuator drive control unit is capable of controlling the electric power of said driving signal to either of both a first electric power of a magnitude necessary for generating a tactile feedback in said movable panel unit and a second electric power which is lower than said first electric power and which is necessary for generating a sound from said sound generating member.

3. The touch panel display as set forth in claim 1, wherein said support structure includes a casing;

said casing includes a bottom wall, a side wall rising from the periphery of said bottom wall, and an upper wall bent from the tip of said side wall and opposed to the periphery of said bottom wall;

said movable panel unit is disposed on the inner side of said side wall and said upper wall in the state of being supported by said movable support member over said bottom wall;

a first space is secured between the whole circumference of the periphery of said movable panel unit and said side wall;

a second space is secured between the whole circumference of the periphery of said front surface of said movable panel unit and said upper wall; and an elastic material with weak elasticity at such a level as not to hamper the vibration of said movable panel unit is provided between the whole circumference of the periphery of said front surface of said movable panel unit and said upper wall so as to close said second space.

4. The touch panel display as set forth in claim 3, wherein said elastic material with weak elasticity at such a level as not to hamper the vibration of said movable panel unit is urethane foam.

5. The touch panel display as set forth in claim 1, wherein said sound generating member is supported over said support structure and disposed at such a position as to front on said back surface, located on the opposite side of said touch panel, of said movable panel unit;

said soft member is provided between said back surface of said movable panel unit and said sound generating member; and said actuator is supported at a position of said support structure located on the opposite side of said movable panel unit with respect to said sound generating member.

6. The touch display panel as set forth in claim 5, wherein said bottom wall of said casing is provided with a recessed part;

said sound generating member is provided on said bottom wall so as to close said recessed part; and said hard member and said actuator are disposed in said recessed part.

7. The touch panel display as set forth in claim 1, wherein said movable panel unit is rectangular plate-like in shape; and said movable support member is disposed between four corners of said movable panel unit and the upper side of said support structure.

8. A touch panel display comprising:

a flat plate-shaped movable panel unit having a display panel and a touch panel integrally stacked over a display surface of said display panel;

a movable support member being elastic and supporting said movable panel unit over a support structure so that said movable panel unit can be displaced along a front surface of said touch panel;

an acoustic vibration unit provided between said movable panel unit and said support structure in a direction along said front surface of said touch panel, the acoustic vibration unit including an actuator vibrating when supplied with a driving signal; and a soft member provided between said touch panel of said movable panel unit and said actuator and being put into a compressed state when said front surface of said touch panel is depressed and into a non-compressed state when said front surface of said touch panel is not depressed, said acoustic vibration unit including:

a sound generating member for generating a sound by vibrating; and a hard member connecting said sound generating member and said actuator to each other and transmitting the vibration of said actuator to said sound generating member, an actuator drive control unit being provided for supplying said driving signal to said actuator, said vibration of said actuator being transmitted to said movable panel unit through said soft member when said soft member is in said compressed state, and said vibration of said actuator being not transmitted to said movable panel unit when said soft member is in said non-compressed state, because of intermediate presence of a space between said soft member and said movable panel unit, or because of absorption of said vibration by said soft member.

9. The touch panel display as set forth in claim 8, wherein said actuator drive control unit is capable of controlling the electric power of said driving signal to either of both a first electric power of a magnitude necessary for generating a tactile feedback in said movable panel unit and a second electric power which is lower than said first electric power and which is necessary for generating a sound from said sound generating member.

10. The touch panel display as set forth in claim 8, wherein said support structure includes a casing;

said casing includes a bottom wall, a side wall rising from the periphery of said bottom wall, and an upper wall bent from the tip of said side wall and opposed to the periphery of said bottom wall;

said movable panel unit is disposed on the inner side of said side wall and said upper wall in the state of being supported by said movable support member over said bottom wall;

a first space is secured between the whole circumference of the periphery of said movable panel unit and said side wall;

a second space is secured between the whole circumference of the periphery of said front surface of said movable panel unit and said upper wall;

said acoustic vibration unit is disposed in said first space; and an elastic material with weak elasticity at such a level as not to hamper the vibration of said movable panel unit is provided between the whole circumference of the periphery of said front surface of said movable panel unit and said upper wall so as to close said second space.

11. The touch panel display as set forth in claim 10, wherein said elastic material with weak elasticity at such a level as not to hamper the vibration of said movable panel unit is urethane foam.

12. An electronic apparatus having an apparatus-side casing, a touch panel display being mounted in or on said apparatus-side casing, and said touch panel display including:

a flat plate-shaped movable panel unit having a display panel and a touch panel integrally stacked over a display surface of said display panel;

a movable support member being elastic and supporting said movable panel unit over a support structure so that said movable panel unit can be displaced in the thickness direction thereof;

an acoustic vibration unit provided between a back surface, fronting on said support structure, of said movable panel unit and said support structure, the acoustic vibration unit including an actuator vibrating when supplied with a driving signal; and a soft member provided between said touch panel of said movable panel unit and said actuator, and being put into a compressed state when a front surface of said touch panel is depressed and into a non-compressed state when said front surface of said touch panel is not depressed, said acoustic vibration unit including:

a sound generating member for generating a sound by vibrating; and a hard member connecting said sound generating member and said actuator to each other and transmitting the vibration of said actuator to said sound generating member, an actuator drive control unit being provided for supplying said driving signal to said actuator, said vibration of said actuator being transmitted to said movable panel unit through said soft member when said soft member is in said compressed state, and said vibration of said actuator being not transmitted to said movable panel unit when said soft member is in said non-compressed state, because of intermediate presence of a space between said soft member and said back surface of said movable panel unit, or because of absorption of said vibration by said soft member.

13. A playing apparatus having an apparatus-side casing, a tough panel display being mounted in or on said apparatus-side casing, and said touch panel display including:

a flat plate-shaped movable panel unit having a display panel and a touch panel integrally stacked over a display surface of said display panel;

a movable support member being elastic and supporting said movable panel unit over a support structure so that said movable panel unit can be displaced in the thickness direction thereof;

an acoustic vibration unit provided between a back surface, fronting on said support structure, of said movable panel unit and said support structure, the acoustic vibration unit including an actuator vibrating when supplied with a driving signal; and a soft member provided between said touch panel of said movable panel unit and said actuator, and being put into a compressed state when a front surface of said touch panel is depressed and into a non-compressed state when said front surface of said touch panel is not depressed, said acoustic vibration unit including:

a sound generating member for generating a sound by vibrating; and a hard member connecting said sound generating member and said actuator to each other and transmitting the vibration of said actuator to said sound generating member, an actuator drive control unit being provided for supplying said driving signal to said actuator, said vibration of said actuator being transmitted to said movable panel unit through said soft member when said soft member is in said compressed state, and said vibration of said actuator being not transmitted to said movable panel unit when said soft member is in said non-compressed state, because of intermediate presence of a space between said soft member and said back surface of said movable panel unit, or because of absorption of said vibration by said soft member.

* * * * *